UNITED STATES PATENT OFFICE.

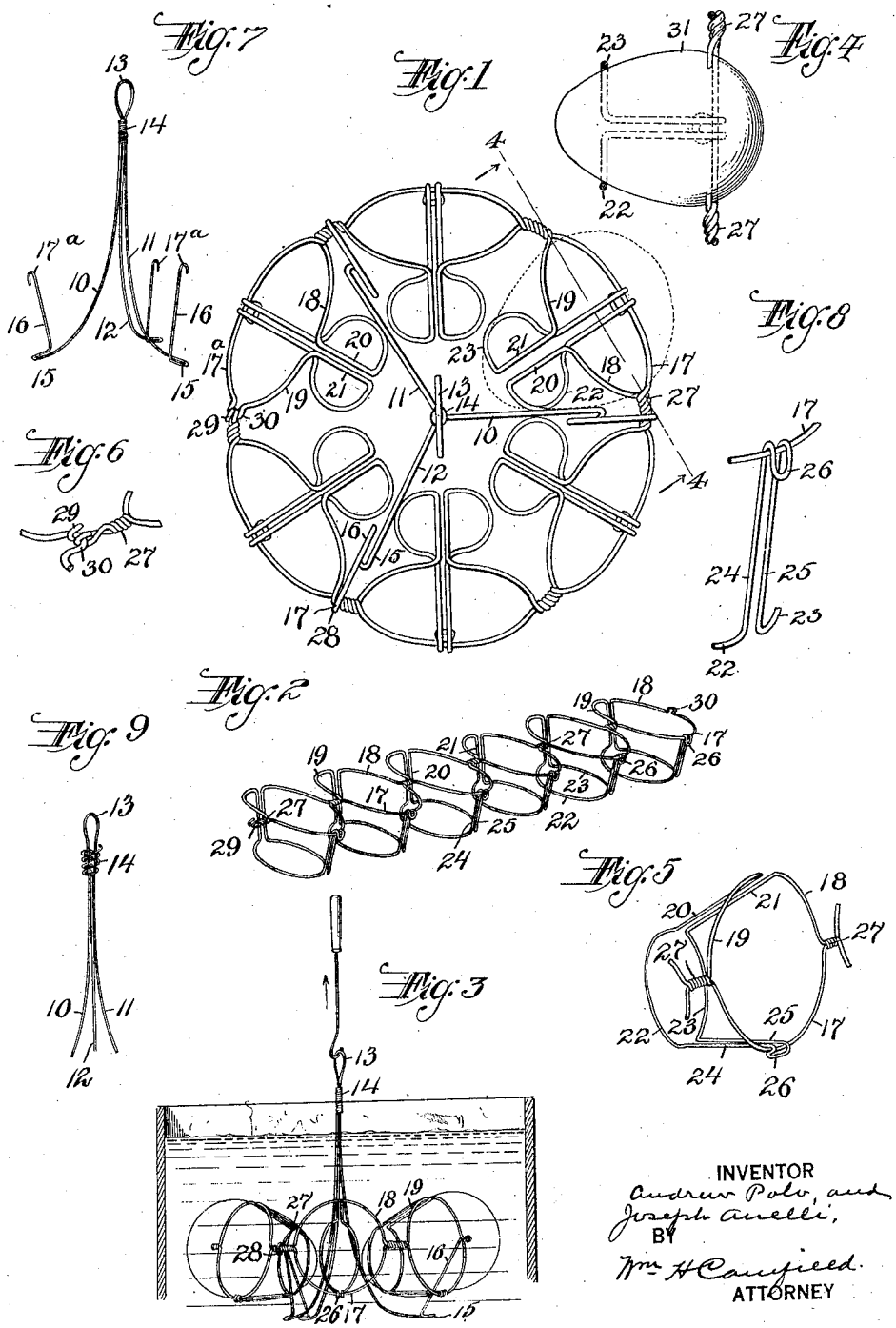

ANDREW POLO AND JOSEPH ANELLI, OF NEWARK, NEW JERSEY.

EGG HOLDER.

1,406,222. Specification of Letters Patent. Patented Feb. 14, 1922.

Application filed March 15, 1921. Serial No. 452,431.

*To all whom it may concern:*

Be it known that we, ANDREW POLO and JOSEPH ANELLI, subjects of the King of Italy, and residents of Newark, county of Essex and State of New Jersey, have invented certain new and useful Improvements in Egg Holders, of which the following is a specification.

This invention relates to an improved egg holder which is economically made and which occupies but a small space and is adapted to hold eggs in a manner that exposes most of the egg, which makes it adaptable for holding them while they are being boiled, and also provides a means for transporting the eggs.

The device is preferably made of wire, and we have devised a form which provides a maximum of security with a minimum of space and of material.

The invention is illustrated in the accompanying drawing, in which Figure 1 is a top view of our improved holder. Figure 2 is a perspective view of the egg holding loops before they are attached to the support. Figure 3 is a side view of the device on a reduced scale, illustrating its use for holding eggs being boiled. Figure 4 is a horizontal section taken on a plane indicated by the line 4—4 in Figure 1. Figure 5 is a perspective view of one of the egg holding loops. Figure 6 is a detail view showing how the two ends of the series of egg holding loops can be connected. Figure 7 is a perspective view of the standard or support for the egg holding loops. Figure 8 is a detail showing part of an egg holding loop, and Figure 9 is a detail of the top part of the standard or support.

We prefer to make the standard so that it is centrally arranged in the device, and in the form shown it is made of wires 10, 11 and 12, two of the wires 10 and 11 being of the same piece and being formed at the top into a loop 13, and the wire 12 is twisted, as at 14, the parts being shown slightly separated in Figure 9 to illustrate more clearly what the construction is. The wires extend radially at the bottom to form stands or feet 15, and then are extended upwardly to form strands 16 having the hooks or loops 17$^a$ at the top which are bent around to embrace the egg holding loops to hold them in position.

The egg holding loops are radially arranged around the support and are constructed so that an egg forced in the loop is held in position, so that it requires a slight pressure to dislodge it and also a slight pressure to seat it in position.

The egg holding loop that we illustrate consists of an outer circular strand, the lower part 17 being formed into a semicircular part, and the wire 18 and the wire 19 together form the upper part of the outer circular strand and form the parallel strands 20 and 21, which are then bent to form the inner circular strands 22 and 23, the curvature of these inner strands being much smaller than the curvature of the strands 18 and 19, so as to form a substantially truncated conical structure.

The wires 22 and 23 are then extended forward, as at 24 and 25, into parallel strands which are doubled, as at 26, and bent over to form a hook, clearly shown in Figures 5 and 8.

We prefer to make these loops in series so that they can be made from a single wire, as will be seen from Figure 2, the wire being formed successively into the structures just described and, as illustrated in Figure 5, being connected by twisting the wires, as at 27, between each loop, these twisted parts 27 being the parts around which the hooks 17$^a$ of the standard are clamped, as shown at 28 in Figures 1 and 3. The twisted part 27 at one end of the series of loops has the two ends of the wire from which the series is made formed into hooks 29, and the other end has an eye or open loop 30, which are hooked together, as shown in Figure 6, so that the series shown in Figure 2 are bent to the position shown in Figure 1.

These parts are hooked together, and when the ends 17 are bent over the whole device is assembled. The curvature of the wires 17, 18 and 19 is smaller than the biggest diameter of the egg, as at 31 in Figure 4, so that when the inner part of the egg holding loop engages the egg this largest diameter of the egg has passed through the outer circular strand of the loop and is thus held securely in position against rattling or slipping.

The smaller or pointed end of the egg goes in first and thus projects inwardly, and when it is to be removed the finger is placed inside and underneath the holder, and by an outward pressure on the smaller end of the egg it is forced out of the loop, the hand being naturally in position to receive the egg.

There is sufficient resiliency to the egg holding loop, since the parallel strands 20, 21, 24 and 25 can be sprung apart and thus compensate for different sizes of eggs within reasonable limitations.

We claim:

1. An egg holder comprising a support with a central stem for suspending it, and a series of egg holding loops comprising inner curved strands and outer curved strands, each being adapted to spread, the inner strand being of a curvature much less in diameter than the outer, and the outer being slightly less in diameter than the largest diameter of the egg.

2. An egg holder comprising a support, a wire bent to form a series of open circular loops with inner and outer curved strands having a yielding grasp, said wire being formed at the ends of the series so that the ends can be joined to form a circular series of loops, said series being secured to the support.

3. An egg holder comprising egg receiving elements made of a single wire bent to form a series of semi-circular strands and then into a semi-circular outer strand, then back into a semi-circular inner strand, then forward and doubled and hooked over a semi-circular strand as first formed, then back to form an opposed semi-circular inner strand to complete the inner loop, then forward and then into a semi-circular outer strand opposite the first one, then twisted to the edge of the first formed strand, and this repeated until the end of the first formed strand is reached, forming the two ends being bent to form a hook, the opposite end of the series having an eye into which the hook is caught.

4. An egg holder comprising a support of twisted wires which are extended at the bottom to form feet and then upwardly as strands so that radially arranged holding means are provided, a wire bent to form a series of open circular loops with inner and outer curved strands, said series of loops being held by the ends of the upwardly extending strands of the support.

In testimony that we claim the foregoing, we have hereto set our hands, this 12th day of March, 1921.

ANDREW POLO.
JOSEPH ANELLI.